Aug. 16, 1932.  G. F. GIBSON  1,872,136
VIBRATION DAMPER
Filed June 1, 1931
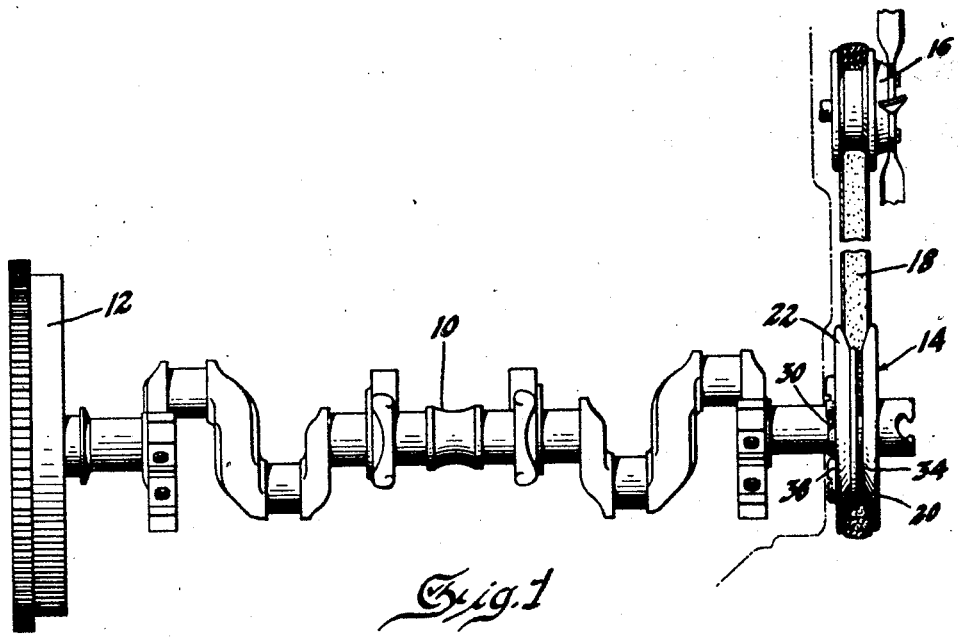
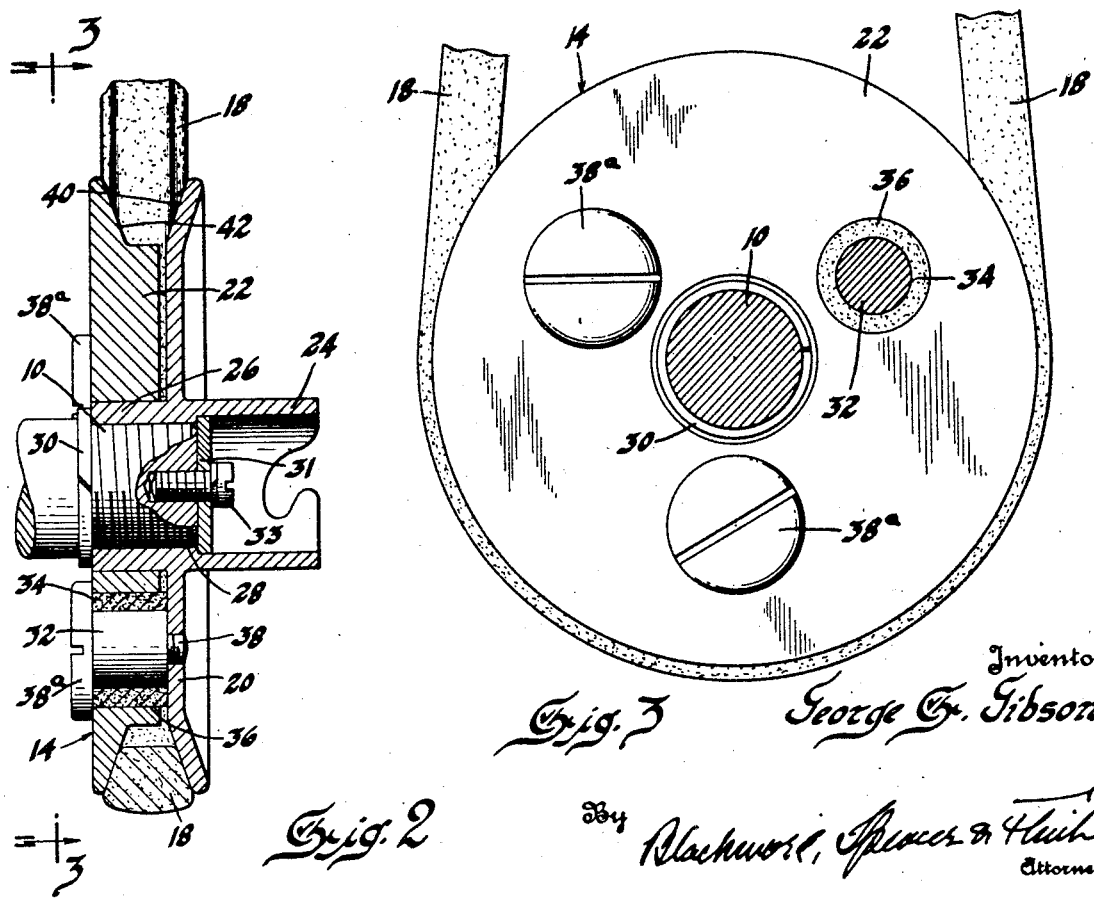

Patented Aug. 16, 1932

1,872,136

UNITED STATES PATENT OFFICE

GEORGE FRANCIS GIBSON, OF LUTON, ENGLAND, ASSIGNOR TO GENERAL MOTORS CORPORATION, OF DETROIT, MICHIGAN, A CORPORATION OF DELAWARE

VIBRATION DAMPER

Application filed June 1, 1931. Serial No. 541,395.

This invention relates to vibration dampers adapted to eliminate or reduce the amplitude of torsional vibrations in shafts or the like subject to intermittent forces tending to rotate them.

It has been proposed hitherto to minimize torsional vibration in the crank shafts of internal combustion engines, which are equipped at one end with rigidly attached fly wheels, by yieldingly mounting on said shaft at a location distant from the fly wheel, an inertia mass frictionally connected thereto to function as a brake, according to one type of known vibration minimizer; or an inertia mass elastically connected to the shaft adapted to act dynamically on the shaft to balance out the vibrations. This invention operates to damp the vibrations by acting as a friction brake.

The invention comprises a flange member fixed to the shaft, an inertia mass yieldably mounted adjacent thereto, the periphery both of said flange and mass being adapted to engage frictionally with a power transmitting element, as for example, a belt for driving an accessory, whereby the belt functions as an intermediate friction element between the flange (crankshaft) and inertia mass.

In the accompanying drawing:

Fig. 1 is an elevation of an engine crank shaft having the invention of this application attached;

Fig. 2 is a longitudinal section through a composite vibration damper and accessory-driving friction wheel, and Fig. 3 is a sectional view on the line 3—3 of Fig. 2.

In Fig. 1 numeral 10 indicates an internal combustion engine crank shaft equipped at the rear end with the usual rigidly attached fly wheel 12. The opposite or front end carries a composite vibration damper and accessory-driving wheel, indicated as a whole by numeral 14, which as illustrated serves to drive an accessory such as a fan pulley 16 by means of a frictional power transmitting element shown as a belt 18.

As illustrated in detail in Fig. 2, the composite vibration damper and driving wheel consists of a flange 20 adapted to be secured rigidly to the crank shaft 10 and a relatively heavy inertia mass or damping member 22 mounted adjacent the flange and yieldable, rotationally, with respect to said flange and shaft. Flange 20 in this embodiment is made integral or otherwise rigid with a tubular hub extending axially on both sides of the flange. The forward extension 24 of said hub is provided with the claw formation usual on so-called starting nuts utilized in manually cranking an engine, and the rearward extension 26 serves to center the damping mass 22 which is centrally bored and sleeved over said extension. The tubular hub is adapted to be sleeved over an extremity 28 of the crank shaft 10. This extremity may be reduced as shown leaving a shoulder at its junction with the body of the shaft. Flange 20 may be rigidly keyed, pinned or secured to the shaft by any approved means. As shown, the interior of the hub and exterior of the shaft extremity are threaded, the hub having been screwed on to the threaded extremity against a lock washer 30 interposed between the hub and the shoulder on the shaft and further retained by a plate 31 secured to the end of shaft end 28 by screw bolt 33, said plate bearing against an annular shoulder within extension 24.

Damping member 22 sleeved over hub extension 26 is yieldably driven by shaft 10 through an interposed damped elastic connection, here shown as consisting of one or more rubber bushings 34 seated in orifices 36 in the damping mass through which extend pins 32 rigidly secured to flange 20 by reduced threaded ends 38 screwed into threaded holes and riveted if desired. Bushings 34 have an axial length somewhat greater than the thickness of the damping member so as to space the inner face of the latter somewhat from the inner adjacent face of flange 20, as illustrated. Pins 32 are provided with heads 38a each having a diameter greater than that of the orifices 36, thus serving to prevent further axial separation of the damping mass 22 and flange 20. Obviously the disposition of the pins and rubber bushings may be reversed with respect to the flange and damping means. As rubber is characterized by a high degree of internal friction when deformed as well as by the property of elasticity, deformation of the rubber bushings 34 affords a damping action upon the flange 20 and shaft 10, while the elasticity tends to restore the damping member 22 to a definite normal position with respect to flange 20, thus preventing "creeping" of the damping member.

A prime factor however in damping vibrations of the shaft 10, is the arrangement of a frictional power transmission element in contact with the peripheries of both flange and damping member to be now set forth. The peripheral portion of flange 22 is provided with a flaring, preferably conoidal, surface 40 inclined outward away from a plane normal to the shaft axis intersecting the hub extension 26. The damping mass is formed with a similar conoidal surface 42 opposite the surface 40 and oppositely inclined from said plane normal to the shaft axis at a preferably substantially equal angle. Thus a groove is formed between the surfaces 40 and 42 in which a frictional transmission element may engage in contact with both flange and damping member in order to drive an accessory. The transmission element may be said belt 18 of suitable cross sectional form to engage the surfaces 40 and 42 with sufficient frictional resistance to damp the oscillations of flange 22 and thereby of shaft 10.

In damping oscillations of the shaft 10 the device operates in principle like known friction dampers. Mass 22 tends to rotate at even speed and so does the rear end of the crankshaft. In case shaft 10 begins to vibrate torsionally at its front end and points removed from fly wheel 12, due to its elasticity and the intermittent forces tending to rotate it acting at intervals coinciding with vibrations of the shaft when vibrating at its natural frequency, the tendency of mass 22 to rotate steadily will oppose through the belt 18 a frictional resistance to the rapid alternate acceleration and deceleration of the flange. The more violent vibrations of large amplitude are apt to occur, as is well known, at higher engine speeds, and these large amplitude vibrations need greater frictional resistance to damp them. By the means shown higher pressures occur between the belt and inclined surfaces at high speeds than at low speeds because of the higher resistance of the accessory driven by the belt.

Although one specific embodiment of the invention has been illustrated and described by specific terms it is not intended to be thereby limited in the scope of protection sought or otherwise than by the definitions of the appended claims.

1. The combination of a shaft subject to torsional vibration, a flange fixed thereto, a damping member elastically mounted adjacent said flange, and yieldable means connecting said flange and damping member whereby the damping member is yieldably driven by said flange, said flange and damping member having a peripheral groove formed partly in each for receiving a frictional power transmitting element.

2. A combination as defined in claim 1 wherein the groove formed by said flange and damping member has flaring side walls.

3. A combination as defined in claim 1 wherein the damping member is connected to the flange by a mass of elastic rubber interposed to permit relative oscillation of the damping member and flange.

4. The combination of a shaft subject to torsional vibrations, a flange fixed thereto, a damping member mounted adjacent said flange, a connection between said damping member and flange comprising a pin fixed to one, a rubber bushing surrounding said pin and seated in an orifice in the other, and a frictional power transmission element engaging the periphery of both flange and damping member.

5. A composite torsional vibration damper and frictional drive wheel, comprising a flange having a hub adapted to be rigidly secured on the end of a shaft subject to torsional vibrations, said hub having starting claws at one side of said flange; a damping member sleeved over said hub at the other side of said flange; means to limit axial separation of said damping member from said flange, means for yieldably resisting rotation of the damping member with respect to the flange, and frictional power transmitting means comprising opposed conoidal friction surfaces on said flange and damping member.

In testimony whereof I affix my signature.

GEORGE FRANCIS GIBSON.